United States Patent
Alsmeyer et al.

(10) Patent No.: US 6,658,077 B2
(45) Date of Patent: Dec. 2, 2003

(54) APPARATUS FOR CATCHING AND COOLING A MELT

(75) Inventors: Hans Alsmeyer, Pfinztal (DE); Dietmar Bittermann, Fürth (DE); Manfred Fischer, Erlangen (DE)

(73) Assignees: Framatome ANP GmbH, Erlangen (DE); Forschungszentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 09/867,255

(22) Filed: May 29, 2001

(65) Prior Publication Data

US 2002/0044622 A1 Apr. 18, 2002

Related U.S. Application Data

(63) Continuation of application No. PCT/DE99/03629, filed on Nov. 15, 1999.

(30) Foreign Application Priority Data

Nov. 26, 1998 (DE) ......................... 198 54 706

(51) Int. Cl.[7] ............................... G21C 9/016
(52) U.S. Cl. ........................................ 376/280
(58) Field of Search ........................ 376/280

(56) References Cited

U.S. PATENT DOCUMENTS

| | | | | |
|---|---|---|---|---|
| 3,930,939 A | * | 1/1976 | Bittermann et al. | 376/282 |
| 4,113,560 A | | 9/1978 | Driscoll et al. | 176/38 |
| 4,130,459 A | * | 12/1978 | Parker et al. | |
| 4,300,983 A | * | 11/1981 | Dalle Donne et al. | |
| H91 H | | 7/1986 | Gabor et al. | 376/280 |
| 4,643,870 A | | 2/1987 | Hunsbedt et al. | 376/280 |
| 5,263,066 A | * | 11/1993 | Szabo et al. | |
| 5,280,509 A | * | 1/1994 | Py et al. | 376/280 |
| 5,307,390 A | | 4/1994 | Gou et al. | 376/280 |
| 5,343,506 A | * | 8/1994 | Artnik et al. | |
| 5,402,456 A | * | 3/1995 | Schabert et al. | 376/280 |
| 5,659,589 A | * | 8/1997 | Wistuba et al. | 376/280 |
| 5,867,548 A | * | 2/1999 | Bittermann et al. | 376/280 |
| 5,889,830 A | * | 3/1999 | Hollmann | |
| 5,946,366 A | * | 8/1999 | Wistuba et al. | 376/280 |
| 6,192,097 B1 | * | 2/2001 | Hau et al. | |
| 6,353,651 B1 | * | 3/2002 | Gou et al. | 376/280 |

FOREIGN PATENT DOCUMENTS

| | | |
|---|---|---|
| DE | 2459339 | 12/1977 |
| DE | 2653258 C2 | 6/1978 |
| DE | 4032736 A1 | 4/1992 |
| DE | 4032736 C2 | 1/1995 |
| DE | 4032736 C2 * | 1/1995 |
| DE | 19512286 C1 | 10/1996 |
| EP | 0766264 * | 1/1996 |
| EP | 9736877 A1 | 10/1996 |

OTHER PUBLICATIONS

Peehs et al, The behavior of concrete in contact with molten corium in the case of a hypothetical core melt accident, Dec. 1979, vol 46, pp. 192 to 198.*
"R&D Activities on Safety Aspects of Future PWR Plants Performed at KfK", (B. Kuczera), Nuclear Safety vol. 34, No. 2, Apr.–Jun. 1993, pp. 213–229.

* cited by examiner

Primary Examiner—Michael J. Carone
Assistant Examiner—John Richardson
(74) Attorney, Agent, or Firm—Laurence A. Greenberg; Werner H. Stemer; Ralph E. Locher

(57) ABSTRACT

An apparatus is described for catching and cooling a melt, in particular a core melt in a containment of a nuclear power plant. A porous body with which the melt comes into contact is provided. A pre-pressurized coolant is fed to the porous body so that the cavities in the porous body are filled with the coolant. After contact between the melt and the porous body, the pre-pressurized coolant penetrates into the melt and as a result leads to fragmentation, solidification and long-term cooling.

17 Claims, 1 Drawing Sheet

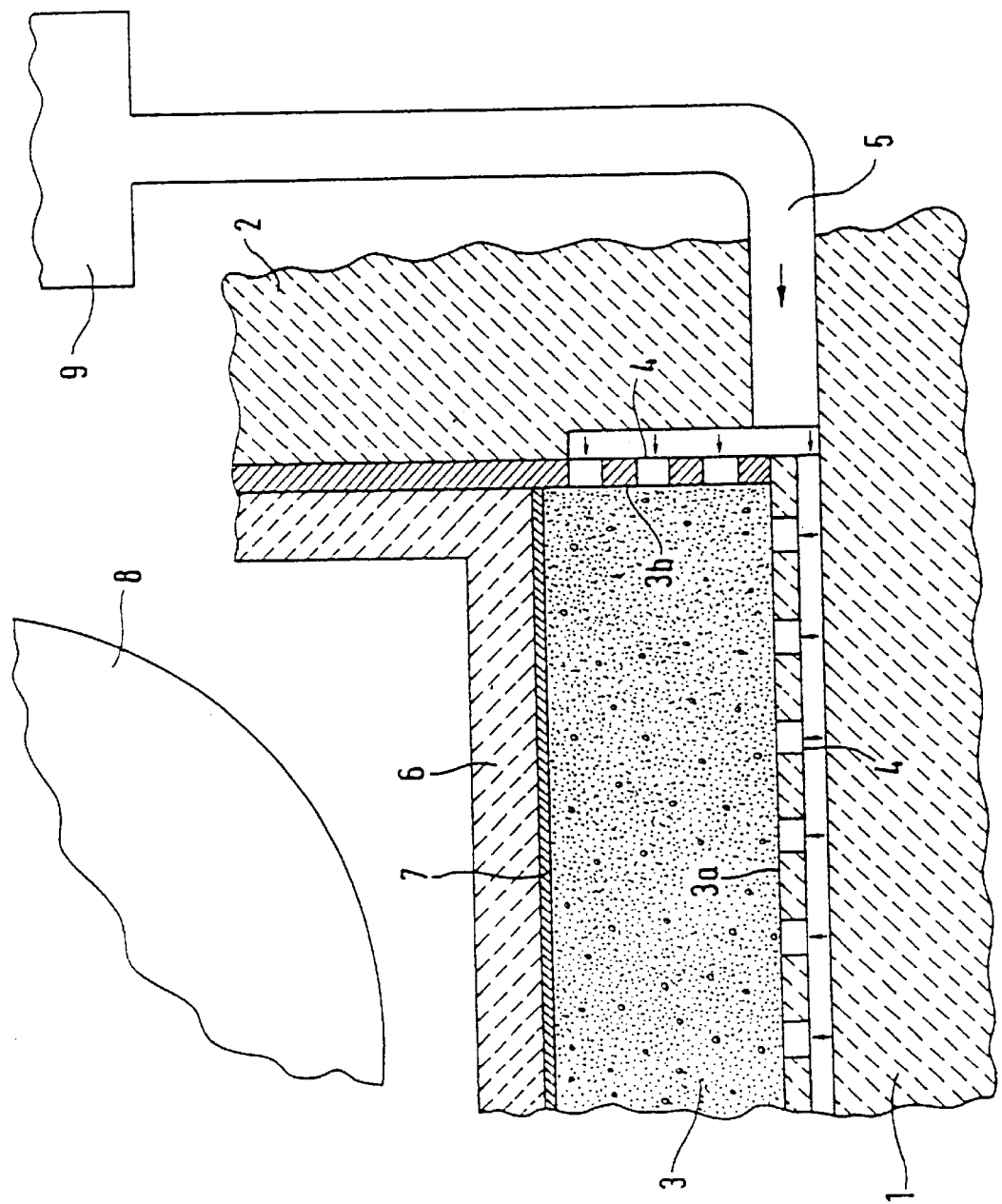

APPARATUS FOR CATCHING AND COOLING A MELT

CROSS-REFERENCE TO RELATED APPLICATION

This application is a continuation of copending International Application No. PCT/DE99/03629, filed Nov. 15, 1999, which designated the United States.

BACKGROUND OF THE INVENTION

Field of the Invention

The invention relates to an apparatus for catching and cooling a melt, in particular a core melt in a containment of a nuclear power plant.

An apparatus of this type is known from German Patent DE 40 32 736 C2. It is used to catch and cool the core melt in a nuclear power plant. For this purpose, a catching trough that is made from a material that can withstand high temperatures, is situated beneath the reactor pressure vessel. The catching trough includes holes that are covered by a sacrificial layer. Short pipe sections that extend upward and end inside the sacrificial layer are fitted into the holes. A space between the catching trough and the foundation of the nuclear power plant can be flooded with cooling water.

If hot core melt comes into contact with the sacrificial layer, the sacrificial layer is eroded over the course of time. As soon as the upper ends of the pipe sections have been exposed, the cooling water which is present beneath the collection trough is intended to advance upward in streams which are predetermined by the number and cross sections of the pipe sections and to evaporate on account of contact with the core melt. As a result, the melt is to be cooled and fragmented before it can reach the bottom of the catching trough.

For this operation, the cooling water in the space below the catching trough has to be under a sufficiently high pressure.

The fragmentation causes cavities or channels to form in the melt that has already been cooled to some extent. As a result, the surface area of the melt is considerably enlarged. Cooling water can subsequently penetrate into these cavities or channels and bring about complete cooling until the melt has solidified.

Under unfavorable conditions, in the known apparatus, hot melt can pass through the holes that are present in the catching trough or may block the pipe sections. This can endanger cooling of the melt configuration.

SUMMARY OF THE INVENTION

It is accordingly an object of the invention to provide an apparatus for catching and cooling a melt that overcomes the above-mentioned disadvantages of the prior art devices of this general type, in which the coolant does not have to be passed through holes in a catching trough and through pipe sections disposed in these holes. Direct communication between the melt and the space beneath the catching trough is to be avoided.

With the foregoing and other objects in view there is provided, in accordance with the invention, an apparatus for catching, fragmenting and then cooling a melt, including a core melt in a containment of a nuclear power plant. The apparatus contains a porous body having a flow resistance to which a pre-pressurized coolant can be fed with a feed-flow rate which is limited by the flow resistance of the porous body.

According to the invention, the object is achieved by the fact that the apparatus for catching and cooling the melt is characterized by a porous body to which pre-pressurized coolant can be fed with a feed-flow rate which is limited by the flow resistance of the porous body.

This has the advantage that the melt, when it comes into contact with the porous body, is cooled uniformly by the coolant that is fed through the cavities of the porous body. It is guaranteed to function even if the melt has already locally penetrated into the porous body. On account of the large number of paths for the incoming flow of the coolant within the porous body, the cooling of the melt is ensured even in these situations. Therefore, the supply of the coolant cannot be interrupted by local effects. The melt comes to a standstill with constant cooling at least on the porous body and at the latest within the porous body, without it being able to react with a large quantity of coolant. The porous body therefore prevents the melt from being able to come into contact with a relatively large quantity of coolant. Advantageously, the flow of coolant in the body can be defined and restricted by the selection of the flow resistance of the porous body. The coolant is advantageously distributed through the porous body in such a way that there is no possibility of a steam explosion but the coolant nevertheless acts successfully on the melt. The initial result is fragmentation of the melt, followed by cooling until complete solidification has occurred.

The porous body is configured, for example, as a layer and is applied to a supporting substructure. A layer of this type is particularly mechanically stable and/or can easily be stabilized by additional elements.

The porous body may be formed of a porous composite material. Examples of suitable composite materials are porous concrete, which contains an aggregate and a binder, and/or a ceramic. The porous body may in this case also be formed partially of concrete and partially of ceramic. The porous body may also be constructed from regular and/or irregular particles. A space for the coolant remains clear between the particles.

The particles may be formed of mineral material, steel, cast iron, and/or ceramic. These materials do not have to withstand the hot melt, since the coolant is responsible for cooling them in the region of contact.

It is also possible for the porous body to be composed partially of particles and partially of a porous composite material, in which case the various materials may be layered on top of one another.

A suitable flow resistance for the coolant in the porous body can be produced either by a suitable porosity of the composite material and/or by the selection of the particle size, the particle shape, or the particle mixture.

The porous body may usefully be covered by a layer of a sacrificial material. This produces the advantage that the melt initially spreads out over the appropriate dry sacrificial material. Since the melt begins to melt the sacrificial material, it is possible to establish a particularly favorable consistency and stratified configuration of the melt for the process of fragmentation and cooling. At the same time, the melt, while the sacrificial material is melting, is already being cooled.

The porous body and the layer of sacrificial material are, for example, cast together in their boundary region. Consequently, they adhere to one another.

According to another example, the porous body and the layer of sacrificial material are separated from one another by a sealing layer. The sealing layer prevents the coolant that is present in the porous body from coming into premature contact with the melt. Moreover, the coolant is prevented from penetrating into the sacrificial material even before the melt has entered, thus possibly causing changes to the structure and action of the sacrificial material.

The porous body is already filled with the coolant, e.g. water, which is under pressure and is fed, e.g. from a reservoir which is at a higher level than the porous body, even before the melt can come into contact with the porous body. The layer of sacrificial material and, if appropriate, the sealing layer on the porous body, initially prevent the coolant from emerging from the porous body. After the layer of sacrificial material and, if appropriate, the sealing layer has/have melted, the pressurized coolant enters the melt from below, fragments the melt with simultaneous evaporation of the coolant, cools it, and allows it to solidify in porous form.

The coolant penetrates into the cavities in the melt that is solidifying in porous form and effects rapid cooling of the melt.

The sealing layer may be formed of, for example, a metal and/or a plastic. It only has to keep the coolant away from the sacrificial material until it is reached and melted by the melt.

The porous body is disposed, for example, directly beneath a reactor pressure vessel. The body may form part of a catching trough.

According to another example, the porous body is disposed laterally offset below a reactor pressure vessel and is connected to a melt-catching device, which is situated directly beneath the reactor pressure vessel, by a channel.

The melt can be guided through the channel to the porous body, which may be part of a collection trough. The lateral configuration results in the advantage that the configuration in which the porous body is situated cannot be damaged by mechanical loads resulting from failure of the reactor pressure vessel.

The coolant can be fed to the underside and/or the side faces of the porous body.

The coolant is supplied, for example, via a cooling channel that leads from a coolant reservoir. This allows a continuous supply of coolant.

The coolant is generally water.

The apparatus according to the invention provides the advantage in particular that a uniform incoming flow of the coolant to the melt is achieved, and for this purpose numerous vertical and transverse flows of the coolant are provided in the porous body on account of its porosity. Each volume element of the body is supplied with sufficient water from all directions. A melt which comes into contact with it is fragmented by the penetrating coolant to such an extent that, on account of the correspondingly high specific surface area, its temperature can be reduced to the vicinity of the coolant temperature. The melt solidifies on or at the latest in the porous body. Since the melt does not interact with a large quantity of water, there is no possibility of a dangerous steam explosion.

Other features which are considered as characteristic for the invention are set forth in the appended claims.

Although the invention is illustrated and described herein as embodied in an apparatus for catching and cooling a melt, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The single FIGURE of the drawing is a diagrammatic, vertical section view through a containment of a nuclear power plant in a region of a base slab and a side wall according to the invention.

DESCRIPTION OF THE PREFERRED EMBODIMENTS

Referring now to the single FIGURE of the drawing in detail, there is shown a containment containing a base slab 1 and walls 2 which stand perpendicularly thereon. In the containment there is a reactor pressure vessel 8, from which, in an unlikely scenario, a nuclear melt could escape. To catch and cool a melt of this type, a porous body 3 is disposed on the base slab 1. For cooling purposes, numerous coolant lines 4, which may be branched, end directly at the porous body 3. The coolant is in this case water. It reaches the coolant lines 4 via a cooling channel 5 that leads from a coolant reservoir 9. If the reservoir 9 is at a sufficiently high level, a coolant pump is not required.

The coolant penetrates into cavities of the porous body 3, where it can spread out in various directions without large accumulations of coolant being formed. If the hot melt subsequently comes into contact with the porous body 3, the melt is reliably cooled by the pre-pressurized coolant which enters it without there being any possibility of a dangerous steam explosion with all the attendant consequences. The melt is fragmented and generally stops above, but at the latest within the porous body 3. Then, as a result of the fragmentation, it has cavities into which the cooling water penetrates, resulting in further cooling until complete solidification has occurred.

The porous body 3 is covered by a layer of sacrificial material 6. The sacrificial material 6 is melted when the melt comes into contact with it, and a mixture of the melt material and the sacrificial material 6 is formed. The sacrificial material 6 is selected in such a way that the mixture has a consistency and stratified configuration which are favorable for the fragmentation and therefore for the subsequent cooling. Moreover, the hot melt has already been cooled to some extent by contact with the sacrificial material 6. The sacrificial material 6 may be formed, for example, of a low-melting concrete, by which the melting point and density of the mixture are reduced.

In the example shown, a sealing layer 7 of metal or plastic is disposed between the porous body 3 and the sacrificial material 6. This serves primarily to keep the coolant that is situated in the porous body 3 away from the sacrificial material 6 in the undisturbed state, so that the properties of this material remain unchanged.

The coolant lines 4 generally end at an underside 3a of the porous body 3. This ensures a sufficient supply of coolant to the porous body 3. To ensure an even better supply, some coolant lines 4 may also end at side faces 3b of the porous body 3.

With the device shown, a hot melt solidifies on the porous body 3 or at the very least before it can reach the base slab 1. This process prevents the hot melt from simultaneously coming into contact with large quantities of coolant.

Consequently, there is no possibility of a steam explosion, which could cause attendant damage.

We claim:

1. An apparatus for catching, fragmenting and then uniformly cooling a melt, the apparatus comprising:
    a coolant supply system containing a pre-pressurized coolant running from said coolant supply system toward the melt for cooling the melt, said coolant supply system having an outlet region; and
    a porous body formed of composite and/or particle material disposed directly at said outlet region of said coolant supply system for catching the melt, said porous body having a plurality of flow channels formed therein, said porous body having a flow resistance, the pre-pressurized coolant being fed with a feed-flow rate limited by said flow resistance of said porous body.

2. The apparatus according to claim 1, including a supporting substructure for supporting said porous body.

3. The apparatus according to claim 1, wherein said porous body contains a porous composite material.

4. The apparatus according to claim 3, wherein said porous composite material is porous concrete, which contains at least one of an aggregate, a binder and a ceramic.

5. The apparatus according to claim 1, wherein said porous body is constructed from particles being at least one of regular particles and irregular particle.

6. The apparatus according to claim 5, wherein said particles contain at least one of a mineral material, steel, cast iron and a ceramic.

7. The apparatus according to claim 1, including a sacrificial layer covering said porous body.

8. The apparatus according to claim 7, wherein said porous body has cavities formed therein which are to be completely filled with the pre-pressurized coolant.

9. The apparatus according to claim 7, wherein said porous body and said sacrificial layer are cast together in their boundary region.

10. The apparatus according to claim 7, including a sealing layer disposed between and separating said porous body and said sacrificial layer.

11. The apparatus according to claim 10, wherein said sealing layer is formed from at least one material selected from the group consisting of metals and plastics.

12. The apparatus according to claim 1, wherein said porous body is to be disposed directly beneath a reactor pressure vessel.

13. The apparatus according to claim 12, including a core-catching device and a channel connected to said core-catching device, said porous body is disposed laterally offset below the reactor pressure vessel and is connected to said core-catching device by said channel.

14. The apparatus according to claim 1, wherein said porous body has an underside and side faces and the pre-pressurized coolant can be fed to at least one of said underside and said side faces of said porous body over a large area.

15. The apparatus according to claim 1, wherein said porous body has an underside and side faces, and including channels connected to said porous body, the pre-pressurized coolant is fed to at least one of said underside and said side faces of said porous body through at least one of said channels and over a large area.

16. The apparatus according to claim 1, wherein said coolant supply system includes:
    a coolant reservoir;
    coolant lines supplying the pre-pressurized coolant to said porous body; and
    a cooling channel connecting said coolant reservoir to said coolant lines.

17. An apparatus for catching, fragmenting and then uniformly cooling a core melt in a containment of a nuclear power plant, the apparatus comprising:
    a coolant supply system containing a pre-pressurized coolant running from said coolant supply system toward the melt for cooling the melt, said coolant supply system having an outlet region; and
    a porous body formed of composite and/or particle material disposed inside the containment directly at said outlet region of said coolant supply system for catching the melt, said porous body having a plurality of flow channels formed therein, said porous body having a flow resistance, the pre-pressurized coolant being fed with a feed-flow rate limited by said flow resistance of said porous body.

* * * * *